(12) United States Patent
Veitch

(10) Patent No.: US 7,756,167 B2
(45) Date of Patent: Jul. 13, 2010

(54) Q-SWITCHED LASER

(75) Inventor: Peter John Veitch, Myrtle Bank (AU)

(73) Assignee: Adelaide Research & Innovation Pty Ltd., Adelaide, S. Australia (AU)

( * ) Notice: Subject to any disclaimer, the term of this patent is extended or adjusted under 35 U.S.C. 154(b) by 175 days.

(21) Appl. No.: 12/096,236

(22) PCT Filed: Dec. 5, 2006

(86) PCT No.: PCT/AU2006/001852

§ 371 (c)(1),
(2), (4) Date: Jun. 5, 2008

(87) PCT Pub. No.: WO2007/065213

PCT Pub. Date: Jun. 14, 2007

(65) Prior Publication Data

US 2008/0291949 A1    Nov. 27, 2008

(30) Foreign Application Priority Data

Dec. 5, 2005    (AU) .............................. 2005906801

(51) Int. Cl.
   *H01S 3/11* (2006.01)
(52) U.S. Cl. ............................. 372/10; 372/27; 372/92; 372/94; 372/106
(58) Field of Classification Search .................. 372/10, 372/27, 92, 94
   See application file for complete search history.

(56) References Cited

U.S. PATENT DOCUMENTS

| | | | |
|---|---|---|---|
| 4,380,073 A | | 4/1983 | Wayne |
| 5,099,486 A | | 3/1992 | Acharekar et al. |
| 5,164,954 A | * | 11/1992 | Su ............................... 372/94 |
| 5,237,331 A | | 8/1993 | Henderson et al. |
| 5,305,334 A | | 4/1994 | Margalit et al. |

(Continued)

FOREIGN PATENT DOCUMENTS

CA    2247874 A1    3/2000

(Continued)

OTHER PUBLICATIONS

Schmid, IEEE J. Quantum Electronics, vol. QE-16, No. 7, Jul. 1980, pp. 790-794.

(Continued)

*Primary Examiner*—Dung T Nguyen
(74) *Attorney, Agent, or Firm*—Greenblum & Bernstein, P.L.C.

(57) ABSTRACT

A system for producing a laser light pulse is disclosed. The system includes a travelling wave or ring laser incorporating a gain medium with polarizing means for introducing substantially polarized radiation having a first polarization state into the travelling wave laser and output coupling means to substantially output couple radiation having an output polarization state from the travelling wave laser. The system further includes polarization changing means incorporated into the optical path of the travelling wave laser for changing the polarization of radiation having the first polarization state to a seeding polarization state, wherein radiation with the seeding polarization state seeds the gain medium, and radiation intensity modulation means for modulating the intensity of radiation in the travelling wave laser to vary the feedback of radiation into the gain medium, wherein the radiation intensity modulation means also modulates the radiation with respect to the output coupling means.

22 Claims, 10 Drawing Sheets

U.S. PATENT DOCUMENTS

| | | |
|---|---|---|
| 2002/0185701 A1 | 12/2002 | Walling et al. |
| 2004/0228376 A1 | 11/2004 | Dane et al. |
| 2006/0043079 A1 | 3/2006 | Dane et al. |
| 2008/0013588 A1* | 1/2008 | Ishizu .......................... 372/94 |
| 2010/0020833 A1* | 1/2010 | Stultz et al. ................... 372/19 |

FOREIGN PATENT DOCUMENTS

| | | |
|---|---|---|
| JP | 2005-183748 A | 7/2005 |
| RU | 999911 A2 | 4/1996 |
| WO | 2005/088782 A1 | 9/2005 |

OTHER PUBLICATIONS

Schmid, IEEE J. Quantum Electronics, vol. QE-16(7), pp. 790-794 (1980).

Rahn, Appl. Opt. vol. 24(7), pp. 940-942 (1985).

Henderson et al., Optics Letters 11(11), p. 715 (1986).

Richards et al., Optics Letters 20(4), p. 371 (1995).

* cited by examiner

Q-SWITCHED LASER

FIELD OF THE INVENTION

The present invention relates to providing long duration and/or low peak power laser pulses. In a particular form the present invention relates to a Q-switched laser resonator capable of dynamically tuning the duration and power of a laser pulse.

BACKGROUND OF THE INVENTION

Many applications of laser radiation require long duration and/or low peak power pulses. For example, a transform-limited pulse of duration about 500 ns is required to achieve a single-shot velocity resolution of about 1 $ms^{-1}$ in an eye-safe coherent laser radar system. In another example, a macro-pulse envelope of duration 1-3 μs is required for artificial guide-star laser sources in multi-conjugate adaptive optics on extremely large optical telescopes. Low peak power pulses are also required in biological/medical applications to prevent damage due to ionisation that might be caused by high peak power within the pulse.

Q-switched lasers are often used to produce pulses for applications requiring energetic pulses. The peak power in a laser pulse can be minimised for a given pulse energy by ensuring that the pulse consists of a single optical mode, thereby preventing interference between lasing modes that would produce high peak power spikes within the pulse, and by increasing the duration of the pulse. However, while there are established techniques for producing single-mode pulses from Q-switched lasers, these lasers typically produce pulses that have durations less than about 50.

Existing techniques for ensuring single-mode content of a pulse include the use of etalons within the resonator, injection seeding and servo control of the resonator length. Injection seeding of the Q-switched laser by the single frequency output of a continuous wave master laser is the preferred technique in a number of applications including remote sensing, as the output of the master laser can also then be used as the reference oscillator in the detection system. Also, it does not require additional components within the Q-switched laser.

There are a number of techniques by which the duration of a Q-switched pulse can be increased, or "stretched". These include: (1) increasing the optical length of the resonator; (2) increasing the output coupling of the resonator or (3) adjusting and "throttling" the Q-switch so as to increase dynamically the output coupling of the laser resonator.

With regard to the first technique referred to above, it is clear that the option of increasing the resonator length will involve significant changes to the resonator configuration which may not be possible given the physical requirements and environment for the system. As would be apparent to those skilled in the art, each time the resonator length is changed it will be necessary to realign the laser making this approach unsuitable for those circumstances where flexibility is required in terms of defining the duration and energy of the laser pulse produced by the system.

Turning now to the second technique, this approach involves extending the duration of a pulse by increasing the output coupling of the laser. This effect can be achieved by either increasing the transmission of the out-coupling mirror or alternatively by adjusting the retardation provided by an intra-resonator wave-plate if the output coupling is achieved via an intra-resonator polarizer. However, increasing the transmission of the out-coupling mirror requires replacement of the mirror once again necessitating an overall realignment of the resonator. A tunable mirror in which the spacing between several mirrors is adjusted could possibly be used as the out-coupling mirror in order to provide dynamic control of the pulse width by changing the transmission characteristics of the mirror. However, this approach is complicated and the output coupling is not linearly related to the spacing of the mirrors.

Changing the output coupling and thereby the resultant pulse width via polarization control requires either mechanical adjustment of an intra-resonator wave plate or electrical adjustment of an intra-resonator Pockels Cell. The latter approach has only been demonstrated for standing-wave lasers and in cavity-dumped ring lasers that are optimised for the production of high peak power pulses and are not suitable for those applications where lower peak power Q-switched pulses are required.

One example of this approach includes the stretched-pulse injection-seeded Q-switched standing-wave laser described in U.S. Pat. No. 5,237,331 where in this system a Pockels cell and a polarizer are used to Q-switch a slave oscillator and the out-coupling is set by the orientation of an intra-resonator quarter-wave retardation plate. Whilst this laser system is able to produce a stretched pulse efficiently, it is a point design resulting in a fixed pulse width that cannot be adjusted in real-time. In addition, to minimize energy losses due to Fresnel reflections, it would be expected that the gain medium would need to include anti-reflection coated entrance and exit faces which will limit the maximum pulse energy as the anti-reflection coatings may be optically damaged at high pulse energies. Finally, standing-wave lasers in general have the disadvantage that they are subject to spatial hole burning which complicates the production of a single-mode output making these lasers unsuitable for coherent remote sensing applications.

Injection-seeded Q-switched travelling-wave or ring lasers for the production of narrow-band pulses have been described in U.S. Pat. No. 5,305,334 and US Patent Application No. 2002/0185701. However, both of the systems described in these documents use transmissive out-coupling mirrors and thus efficient dynamic control of the pulse duration cannot be achieved as pulse energy would be discarded from the resonator if the Pockels cell Q-switch was throttled. Furthermore, the output pulses would have a mixed polarization state, which is unsuitable for remote sensing applications.

The third technique to increase the pulse width is by the use of Q-switch throttling (see for example W. E. Schmid, IEEE J. Quantum. Electronics Vol. QE-16(7) pp. 790-4 (1980)) which in principle should allow for the dynamic variation of both pulse width and energy. This approach has only been demonstrated using standing-wave resonators with an out-coupling mirror which, as described previously, results in a system with low energy efficiency.

In summary, there have been a number of techniques for producing long duration Q-switched pulses that have been demonstrated in the prior art. However, these approaches all suffer from one or more of the following disadvantages: inefficiency, spatial-hole burning, dynamic control not possible, single point operation, inability to be used with Brewster-angled gain media, and mixed polarization state output.

It is an object of the present invention to provide a system for producing a laser light pulse capable of efficiently generating a pulse of variable duration and peak power.

It is a further object of the present invention to provide a system capable of producing a laser light pulse with a substantially plane polarization state.

SUMMARY OF THE INVENTION

In a first aspect the present invention accordingly provides a system for producing a laser light pulse, said system including a travelling wave or ring laser incorporating a gain medium, said system including:

polarizing means for introducing substantially polarized radiation having a first polarization state into said travelling wave laser;

output coupling means to substantially output couple radiation having an output polarization state from said travelling wave laser;

polarization changing means incorporated into an optical path of said travelling wave laser for changing the polarization of radiation having said first polarization state to a seeding polarization state, wherein radiation with said seeding polarization state seeds said gain medium for producing said laser light pulse; and radiation intensity modulation means for modulating an intensity of radiation in said travelling wave laser to vary the feedback of said radiation into said gain medium, wherein said radiation intensity modulation means also modulates said radiation with respect to said output coupling means thereby modulating a degree of output coupling of radiation from said travelling wave laser.

By being able to both simultaneously modulate the degree of feedback into the gain medium and the output coupling of the travelling wave laser there is provided the ability to dynamically shape in real time the pulse produced by the system, thereby allowing the duration, shape and peak power of the pulse to be customised for a given application. Another advantage of the present invention is that the travelling-wave architecture enables the use of gain media with Brewster-angled entrance and exit faces, prevents spatial-hole burning and reduces the amount of optical isolation required to prevent destabilisation of the master laser.

Preferably, said radiation intensity modulation means includes variable polarization changing means incorporated into the optical path of said travelling wave laser for variably changing the polarization of a proportion of radiation having said seeding polarization state to said output polarization state thereby modulating the degree of output coupling of radiation from said travelling wave laser.

Preferably, said output polarization state and said seeding polarization state are substantially the same.

Preferably, said gain medium includes Brewster-angled entrance and exit faces and wherein said polarizing means includes reflecting input laser radiation from a master laser from said exit face of said gain medium.

Optionally, said gain medium includes an entrance and an exit face and wherein said polarizing means includes a polarizer incorporated into the optical path between said exit face and said radiation intensity modulation means.

Optionally, said polarizing means and said output coupling means are a unitary polarizer element.

Preferably, said polarization changing means includes a half wave retardation plate.

Preferably, said variable polarization changing means includes a Pockels cell.

Optionally, the variable polarization changing means and the polarization changing means is a unitary device.

Preferably, the unitary device is a Pockels cell.

In a second aspect the present invention accordingly provides a method for producing a laser light pulse from a travelling wave or ring laser incorporating a gain medium, said method including:

introducing substantially polarized radiation having a first polarization state into said travelling wave laser;

changing the polarization of radiation having said first polarization state to a seeding polarization state, wherein radiation with said seeding polarization state seeds said gain medium for producing said laser light pulse;

output coupling radiation having an output polarization state from said travelling wave laser;

modulating the intensity of radiation in said travelling wave laser to vary the feedback of said radiation into said gain medium, wherein said modulating also modulates the degree of output coupling of radiation from said travelling wave laser.

In a third aspect the present invention accordingly provides a laser light pulse produced in accordance with the second aspect of the present invention.

In a fourth aspect the present invention accordingly provides a system for producing a laser light pulse, said system including a travelling wave or ring laser incorporating a gain medium, said system including:

polarizing means for introducing substantially polarized radiation having a first polarization state into said travelling wave laser and to output couple radiation having substantially the same polarization state from said travelling wave laser;

polarization changing means located in an optical path of said travelling wave laser between said polarizing means and an input for said gain medium for changing the polarization of radiation having said first polarization state to a seeding polarization state, wherein radiation with said seeding polarization state seeds said gain medium for producing said laser light pulse; and variable polarization changing means incorporated into the optical path of said travelling wave laser for variably changing the polarization of a proportion of radiation having said seeding polarization state to said output polarization state thereby modulating the degree of output coupling of radiation from said travelling wave laser, wherein the variable polarization changing means is located between an output of the gain medium and the polarizing means.

BRIEF DESCRIPTION OF THE DRAWINGS

Embodiments of the present invention will be discussed with reference to the accompanying drawings wherein.

In the following description, like reference characters designate like or corresponding parts throughout the several views of the drawings.

DESCRIPTION OF EMBODIMENTS

Figure 1:
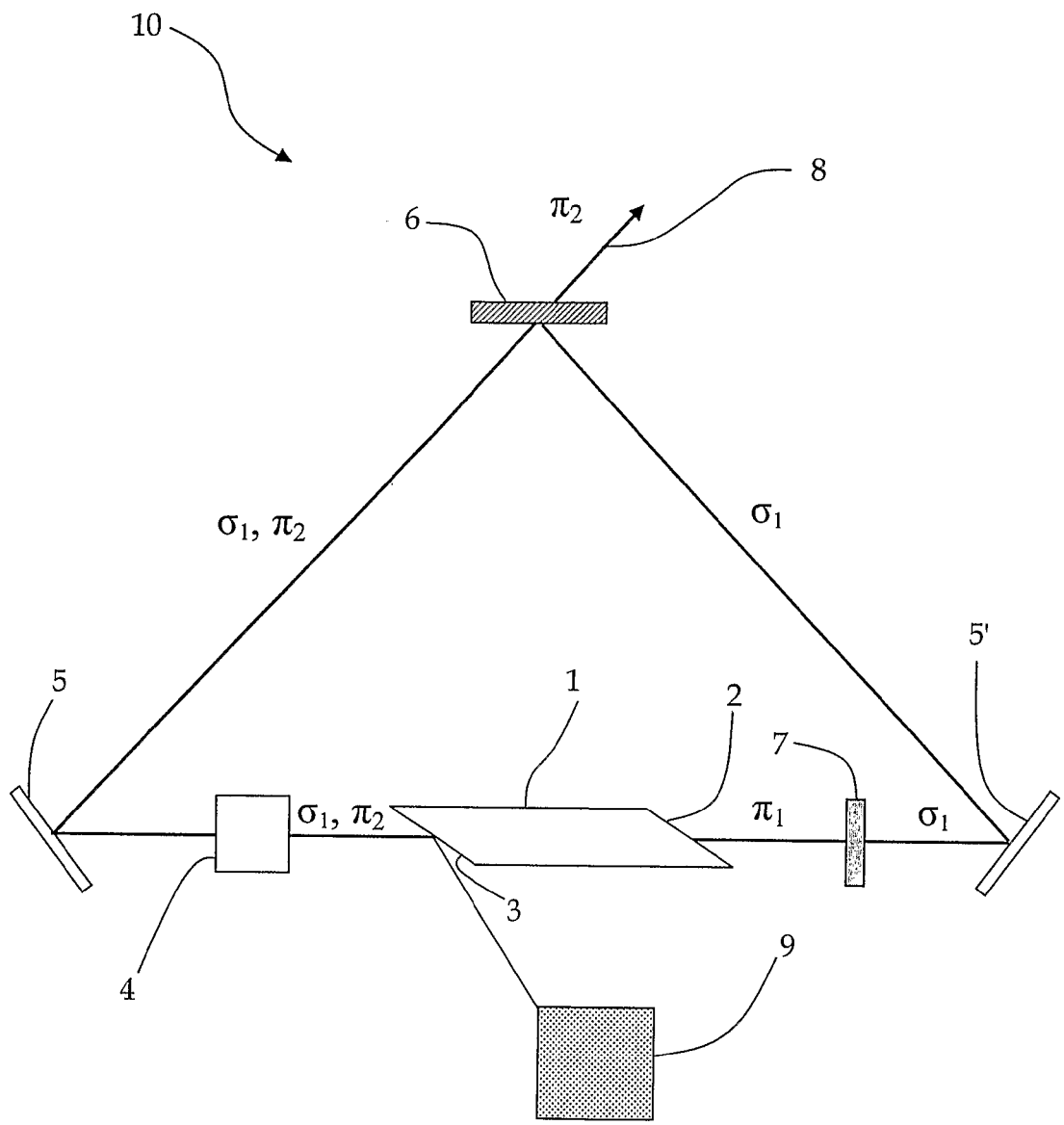
FIG. 1 is a schematic view of a system for producing a laser pulse according to a first illustrative embodiment of the present invention.

Referring now to FIG. 1, there is shown a system 10 for producing a laser pulse according to a first illustrative embodiment of the present invention. System 10 is configured as a travelling-wave or ring laser resonator including a gain medium 1 having a Brewster-angled entrance and exit faces 2, 3. Brewster-angled exit face in this embodiment functions as a polarization means for introducing radiation having a first polarization state, in this case σ-polarized radiation, into the travelling wave laser.

System 10 includes a pair of highly reflecting mirrors 5, 5' located on opposed sides of gain medium 1. First mirror 5 is oriented to reflect laser radiation emitted from the direction of the exit face 3 of gain medium 1 to polarizing element 6 which is oriented to transmit π-polarized radiation and highly reflect σ-polarized radiation in the direction of second mirror 5' which is further oriented to reflect laser radiation in the direction of the entrance face 2 of gain medium 1. As such, polarizing element 6, functions as an output coupling means to output couple radiation having the output polarization state which in this embodiment is π-polarized radiation.

One type of gain medium suitable for this purpose is described in the applicant's PCT Application No. PCT/AU2005/000354, entitled "Optical Amplifier" and whose disclosure is herein incorporated by reference in its entirety. Another type of gain medium suitable for this purpose is a conventional zigzag Nd:YAG slab.

Intermediate to first mirror 5 and exit face 3 of gain medium 1 is located a Pockels cell 4 which acts as a variable retardation plate dependent on an applied voltage. In this manner, Pockels cell 4 functions as a variable polarization changing means incorporated into the optical path of the travelling wave laser that variably changes the polarization of a proportion of radiation having the seeding polarization state to the output polarization. Alternatively, as would be apparent to those skilled in the art, Pockels cell 4 may be located between first mirror 5 and polarizing element 6. Intermediate to second mirror 5' and entrance face 2 of gain medium 1 is located a half-wave retardation plate 7 or polarization changing means which rotates the plane of polarization by 90° to the seeding polarization state for seeding gain medium 1. Similarly, half-wave retardation plate 7 may be located between second mirror 5' and polarizing element 6. System 10 is injection seeded by master laser 9. One type of master laser is the monolithic non-planar ring oscillator produced by Innolight GmbH of Hannover, Germany.

As an example, an injection seeded, laser-diode face pumped, edge conduction cooled, conventional zigzag, Nd:YAG slab, with an Inrad PKC02-FC09/1064 Pockels cell, and CVI Laser Corporation Y1-1037-17-S mirrors, QWPO-1064-10-2 half-wave plate, and TFP-1064-RW-28.6-14.3-3.2 thin-film polarizer can produce a transform-limited pulse having energy of about 20 mJ with a duration of about 800 ns from a pump pulse energy of about 100 mJ. Typically, only about 100 µW of power from the master laser is required to injection-seed the Q-switched laser.

In operation, laser radiation from master laser 9 is reflected from Brewster-angled exit face 3 to generate a σ-polarized laser beam that matches the path and shape of the $TEM_{00}$ eigenmode within system 10. A servo system may be used to provide the necessary frequency matching. Suitable pulse build-up time servo techniques include those such as described by Rahn in L. A. Rahn, Appl. Opt. Vol. 24(7) pp. 940-2 (1985) and also in U.S. Pat. No. 5,099,486. In general these techniques involve measuring the time delay between the closing of the Q-switch and the production of the Q-switched pulse. This time is minimised if the frequency of one of the eigenmodes is equal to the frequency of the light from the master laser. A dither servo-control system can thus be used to ensure frequency matching.

Initially, the σ-polarized seeding beam from the master laser travels through Pockels cell 4 which is configured to ensure high loss for π-polarized radiation. The polarization of the initial seeding beam in its first pass through the system relative to master laser 9 is generally indicated in the Figures by subscript 1. After transmission through Pockels cell 4, the injected beam will remain predominantly σ polarized. This σ-polarized component is then reflected from polarizer 6, further reflected by second mirror 5' to pass through retarder 7 which rotates the plane of polarization by 90° thereby converting the injected laser beam to π polarization.

The resultant π-polarized light will then be amplified as it passes through and in the process optically seeding gain medium 1 and then once again propagates towards Pockels cell 4. After the second pass though Pockels cell 4 (as generally indicated by subscript 2) the beam remains predominantly π polarized and hence most of it is transmitted through polarizer 6.

To generate a laser pulse, the potential difference applied to Pockels cell 4 is changed so that the Pockels cell 4 changes from the high loss state to a low loss state with the resulting change in the Q-factor of the resonator causing the π-polarized radiation within gain medium 1 to seed the giant pulse. By varying the rate of change of the voltage applied to Pockels cell 4 the shape and duration of the resultant pulse can be modified. By way of example, if the voltage applied to the Pockels cell causes it to provide nearly half-wave rotation then most of the π-polarized beam from the gain medium will be converted to σ polarization and thus be reflected back into the gain medium, producing a short duration pulse. If a smaller voltage is applied then the out-coupling will be larger and thus the pulse will have a longer duration. Thus, in this illustrative embodiment changing the voltage applied to Pockels cell 4 in system 10 provides a radiation intensity modulation means that both varies the feedback of radiation into gain medium 1 and the amount of output coupling of radiation with respect to polarizing element 6.

Figure 2:
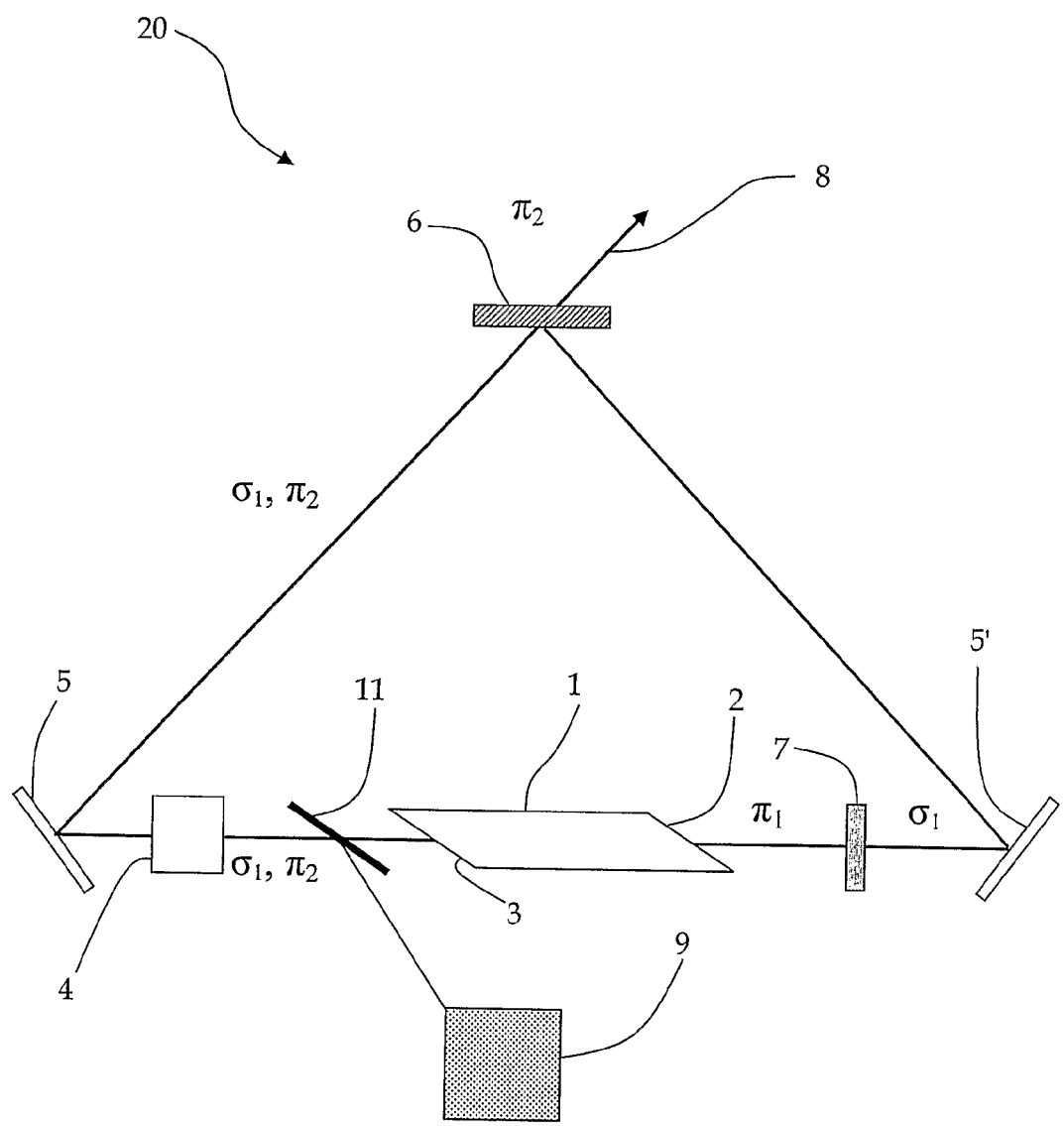
FIG. 2 is a schematic view of a system for producing a laser pulse according to a second illustrative embodiment of the present invention.

Referring now to FIG. 2, there is shown a system 20 for producing a laser pulse according to a second illustrative embodiment of the present invention. In this embodiment, either an optical surface or polarizer 11 is inserted into the resonator shown in FIG. 1 between the exit face 3 of gain medium 1 and Pockels cell 4. In the example of an optical surface being used, optic 11 is orientated so that a π-polarized beam emerging from exit face 3 will not be reflected. Similarly in an example of a polarizer being used, polarizer 11 is orientated such that a π-polarized beam emerging from exit face 3 will not be reflected. In this manner, the σ-polarized seed beam from master laser 9 can then be coupled into the Q-switched resonator by reflection from the surface of optic or polarizer 11 which may be easier in practice in some circumstances.

Figure 3:
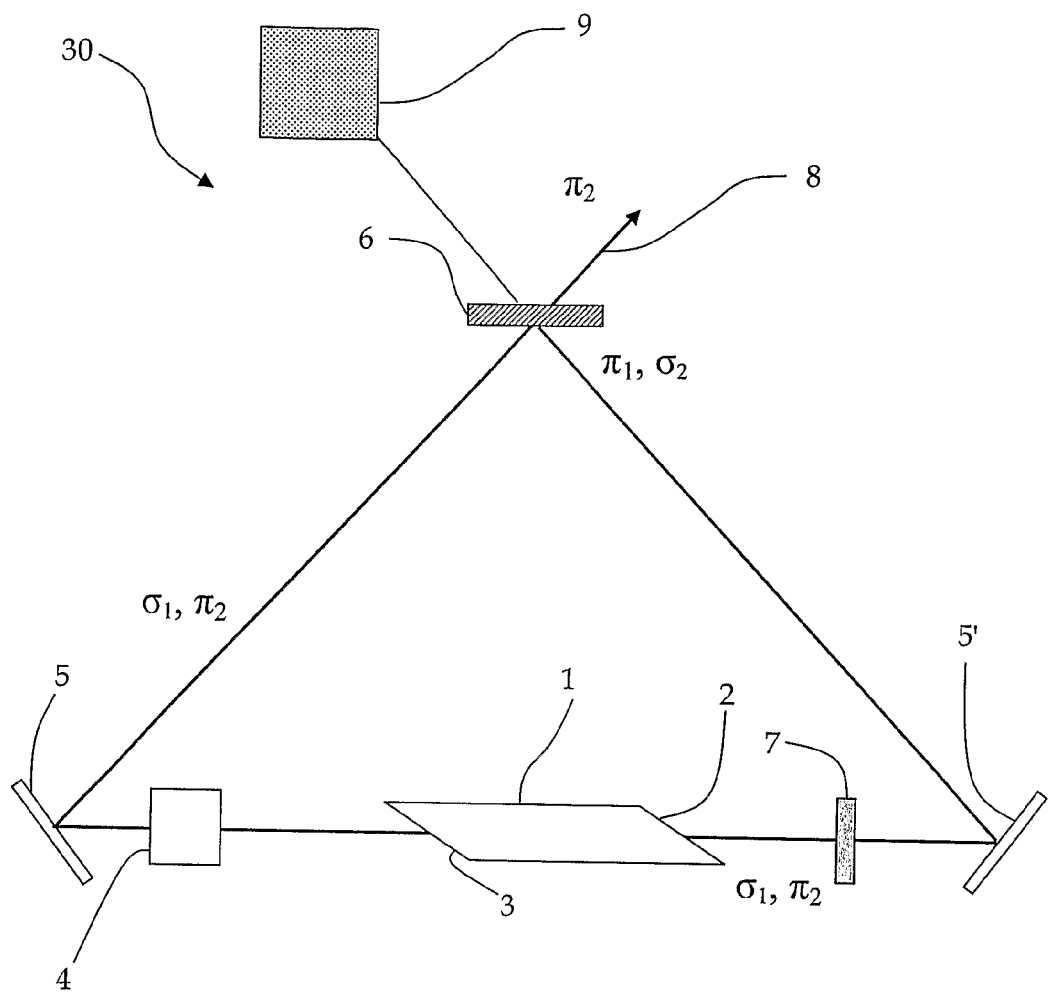
FIG. 3 is a schematic view of a system for producing a laser pulse according to a third illustrative embodiment of the present invention.

Referring now to FIG. 3, there is shown a system 30 for producing a laser pulse according to a third illustrative embodiment of the present invention. In this embodiment, the seed beam from master laser 9 passes through polarizer 6 resulting in a π-polarized beam entering the resonator which is transformed to a polarization by the first pass through retarder 7 after reflection from mirror 5'. This σ-polarized beam is partially reflected at entrance face 2, then amplified as it propagates through gain medium 1 and then partially reflected at exit face 3. The σ-polarized beam emerging from face 3 then passes through Pockels cell 4 configured to be in the high loss state for π-polarization, after which it remains mostly σ polarized. The σ-polarized component is reflected at polarizer 6, passes through retarder 7, which transforms the beam to π polarization, and is then amplified as it passes through gain medium 1. The π-polarized beam emerging through face 3 then passes through Pockels cell 4, after which it remains mostly π polarized and most of it is thus transmitted through polarizer 6. When the Q-switch is switched to the low-loss state, the n-polarized radiation in the gain medium seeds the giant pulse. This embodiment of the present invention has the advantage of having the lowest component count. In addition, the transmissive losses of the polarizer are external to the system 30, thereby improving energy efficiency of the resonator.

In one example, system 30 has been employed to produce an injection-seeded Q-switched laser suitable for coherent remote sensing of wind-fields with a single-shot velocity resolution of about 1 ms$^{-1}$. In this application, transform-limited injection-seeded pulses of duration about 500 ns are required. In order to obtain good signal-to-noise performance in atmospheres with low aerosol concentrations and a range of about 10 km, pulse energies of approximately 10 mJ are required with nearly diffraction limited beam quality. System 30 has proved to have significant advantages for this application, as it has a low part count and injecting the master laser beam through polarizer 6 greatly simplifies alignment of the resonator.

Additionally, a Brewster-angled window placed between output face 3 and Pockels cell 4 is used to sample part of the intra-cavity laser beam and check for resonant build-up of the master power. A 'ramp-and-fire' injection-seeding control system (see for example description of this technique in S. W. Henderson et al, Optics Letters 11(11), p. 715 (1986)) has been used to ensure reliable injection-seeding of the Q-switched laser.

In this application, gain medium 1 is an Er,Yb:phosphate glass CPFS zigzag slab (as per J. Richards and A. McInnes, Optics Letters 20(4) p. 371 (1995)) that is pumped by Thales Laser Diodes quasi-CW TH-Q5401-A1 diodes, Pockels cell 4 is a Inrad PBC06-DC04/1535 and polarizer 6 is a CVI TFP-1550 thin-film polarizer. System 30 in this application produces transform-limited 450 ns duration pulses.

Figure 4:
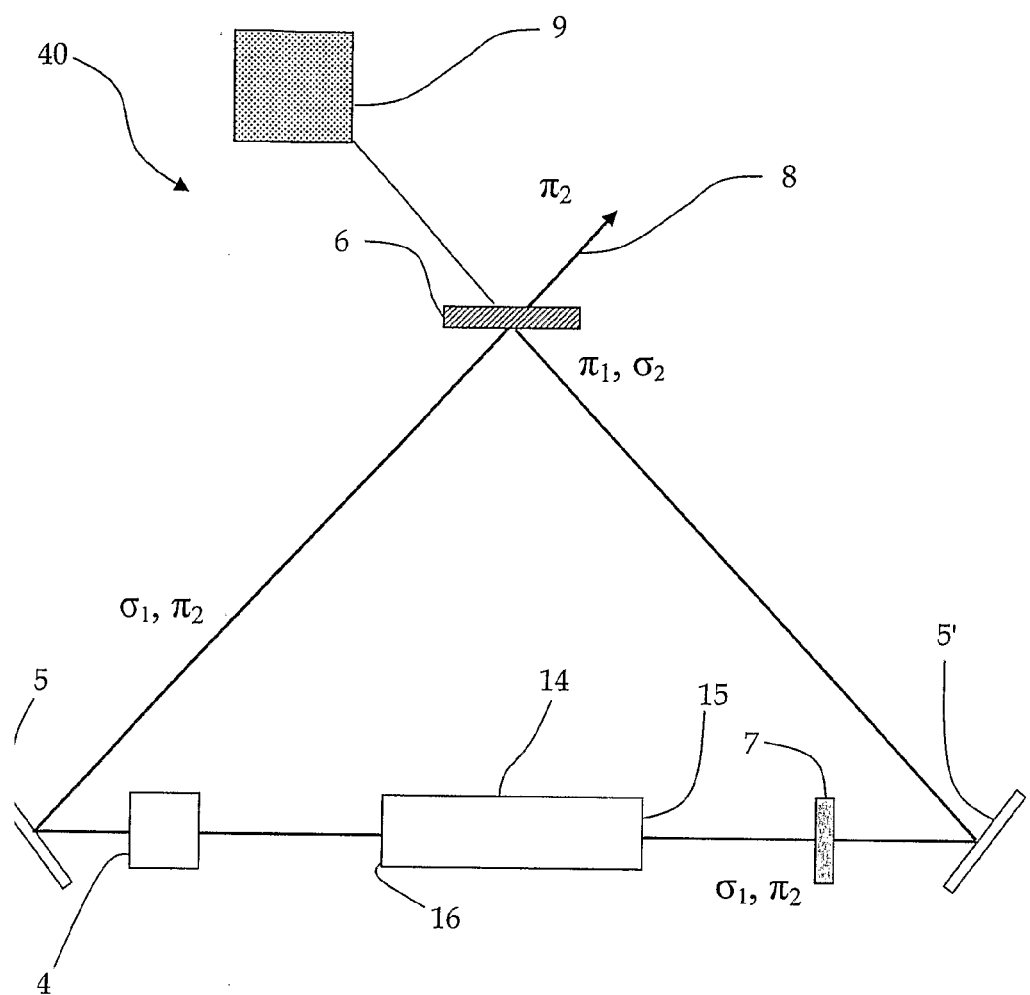
FIG. 4 is a schematic view of a system for producing a laser pulse according to a fourth illustrative embodiment of the present invention.

Referring now to FIG. 4, there is shown a system 40 for producing a laser pulse according to a fourth illustrative embodiment of the present invention. System 40 in this embodiment is essentially identical to that shown in FIG. 3 except that gain medium 1 has been replaced with new gain medium 14 having an anti-reflection coated entrance face 15 and exit face 16 rather than Brewster-angled entrance and exit faces of gain medium 1 as depicted in FIGS. 1 to 3. In a further variation (not shown), the retardation plate 7 may be located between gain medium 14 and Pockels cell 4 resulting in the σ-polarized radiation in gain medium 14 seeding the giant pulse. This may be used in those gain mediums such as Nd:YLF to achieve a different lasing wavelength which results from seeding of the gain medium 1 by σ-polarized radiation in contrast to the wavelength that results from seeding with π-polarized radiation. In yet a further variation (not shown), Pockels cell 4 may be located between polarizer 6 and gain medium 4 resulting in σ-polarized radiation in gain medium 4 seeding the giant pulse. In yet a further variation (not shown), retardation plate 7 is not required, and instead a voltage or potential difference near the half-wave voltage is applied to Pockels cell 4 in order to produce high losses. The applied potential difference is then switched to near 0 volts to generate the giant pulse.

Figure 5:
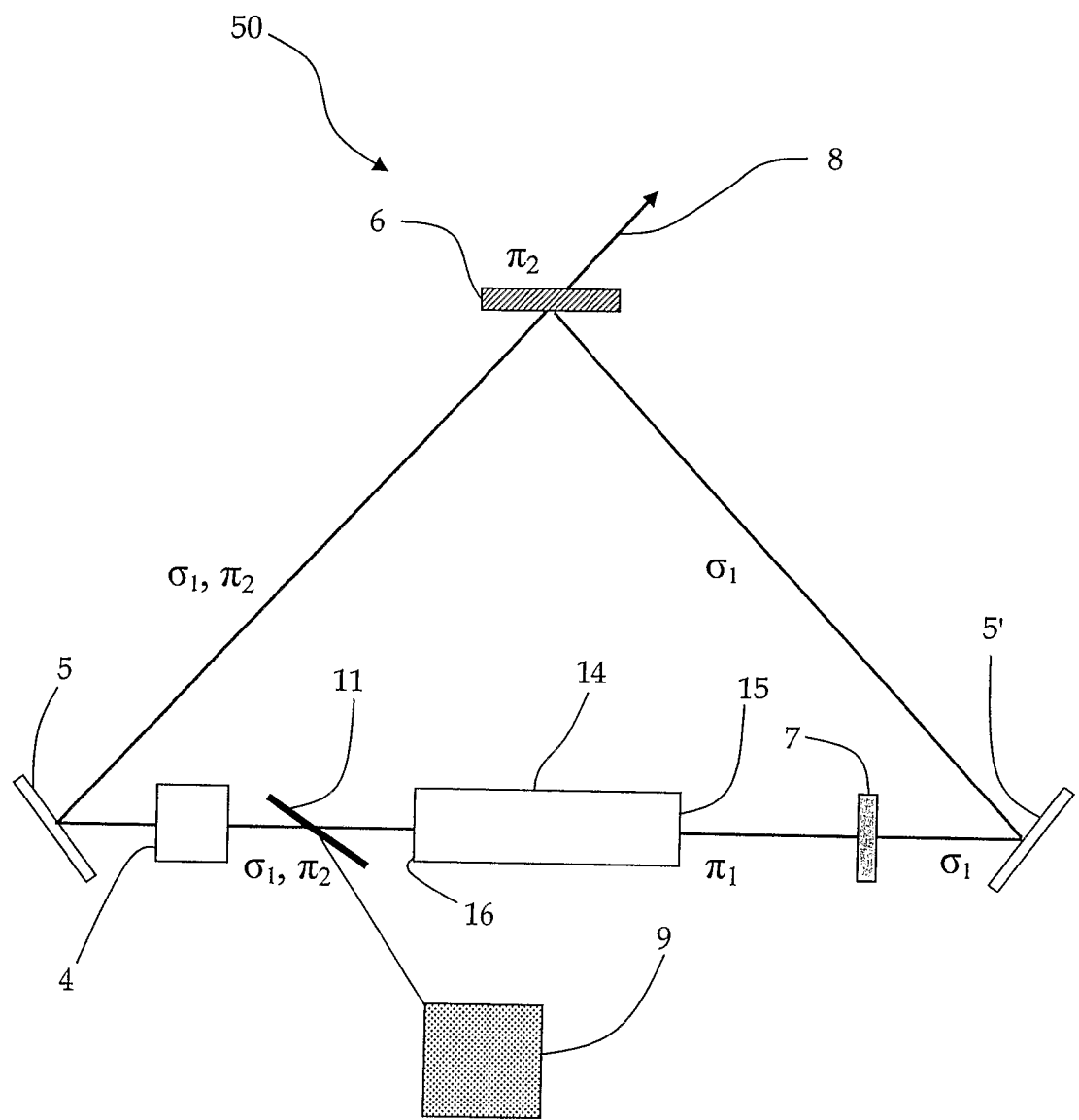
FIG. 5 is a schematic view of a system for producing a laser pulse according to a fifth illustrative embodiment of the present invention.

Referring now to FIG. 5, there is shown a system 50 for producing a laser pulse according to a fifth illustrative embodiment of the present invention. The operation of the resonator in this embodiment is the same as for that shown in FIG. 2 except that gain medium 1 has been replaced with new gain medium 14 which has anti-reflection coated entrance face 15 and exit face 16 rather than Brewster-angled entrance and exit faces of gain medium 1. In a further variation (not shown), retardation plate 7 in FIG. 6 may be located between gain medium 14 and optic or polarizer 11. In this variation, the σ-polarized radiation in gain medium 14 seeds the giant pulse.

Figure 6:
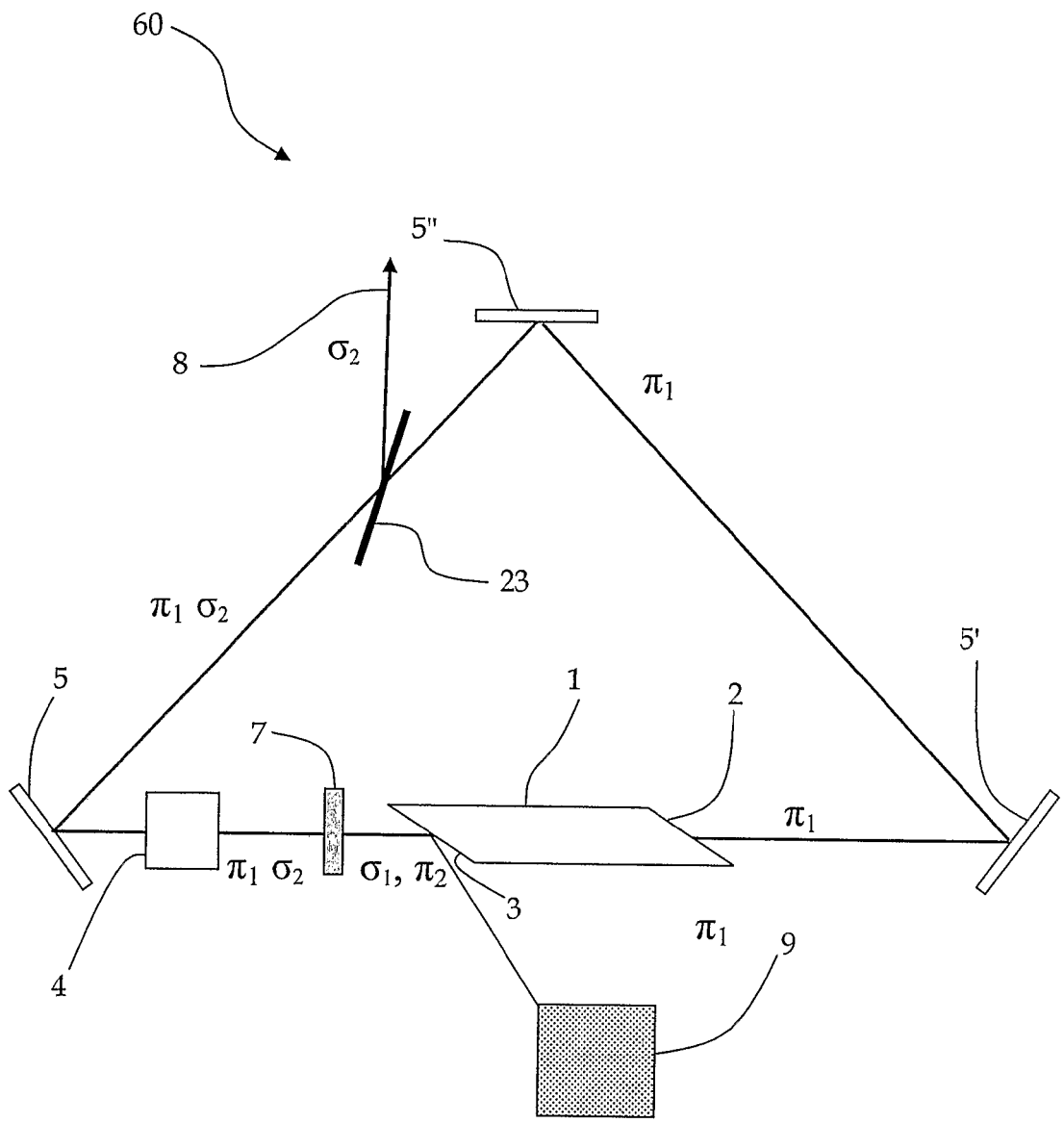
FIG. 6 is a schematic view of a system for producing a laser pulse according to a sixth illustrative embodiment of the present invention.

Referring now to FIG. 6, there is shown a system 60 for producing a laser pulse according to a sixth illustrative embodiment of the present invention. Similar to the system shown in FIG. 1, system 60 includes a gain medium 1 with Brewster-angled entrance face 2 and exit face 3 that is enclosed within a travelling-wave laser resonator. The resonator includes Pockels cell 4, mirrors 5, 5' and 5" that are each highly reflecting and oriented to form a travelling wave resonator, a half-wave retardation plate 7 oriented such that it rotates the plane of polarization by 90°, and a polarizer 23. The output beam is identified by the numeral 8.

A near-zero potential difference is applied to Pockels cell 4, thereby creating a high-loss state within the resonator. The potential difference applied to Pockels cell 4 in the high-loss state is such that the output coupling at polarizer 23 is larger than the round-trip gain. At a chosen time, the magnitude of the potential difference applied to Pockels cell 4 is increased, reducing the output coupling at thin-film polarizer 23 and allowing the Q-switched giant pulse to develop. Relaxation oscillation spikes that may occur at the start of the giant pulse can be inhibited by using pre-lase, as would be produced using a non-zero potential difference in the high loss state, or by injection seeding.

System 60 is injection-seeded by reflecting a σ-polarized laser beam produced by master laser 9 from exit face 3 so as to match the path and shape of the lasing mode within the Q-switched resonator. After transmission through retardation plate 7 and Pockels cell 4, the beam is mostly π polarized. The π-polarized component is transmitted through polarizer 23 and then passes through gain medium 1. After its second pass through retardation plate 7 and Pockels cell 4, the beam is mostly σ polarized and thus most of it is reflected from polarizer 23. In yet a further variation (not shown) similar to the final variation discussed with reference to the embodiment illustrated in FIG. 4, retardation plate 7 is removed from the resonator shown in FIG. 6 and the potential difference applied to Pockels cell 4 is approximately equal to the half-wave voltage thereby creating the high-loss state. As discussed previously, reducing the applied voltage then reduces the losses and allows the giant pulse to develop.

Figure 7:
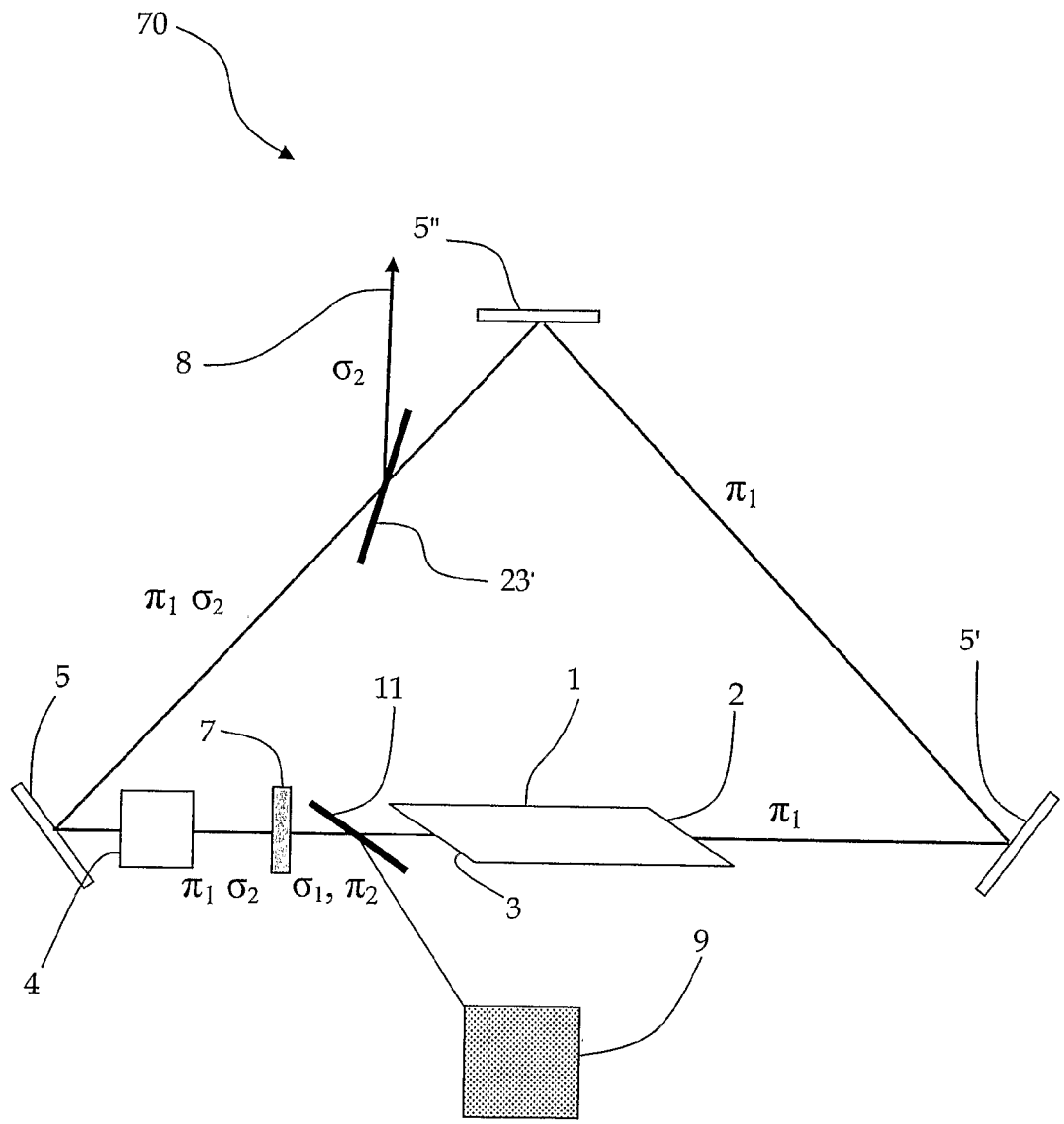
FIG. 7 is a schematic view of a system for producing a laser pulse according to a seventh illustrative embodiment of the present invention.

Referring now to FIG. 7, there is shown a system 70 for producing a laser pulse according to a seventh illustrative embodiment of the present invention. In this embodiment, the system 60 depicted in FIG. 6 is modified by inserting optical surface or polarizer 11 to reflect light from master laser 9 into the resonator (similar to that shown in FIG. 2). Optic or polarizer 11 is orientated so that a π-polarized beam emerging from exit face 3 will not be reflected. The σ-polarized seed beam from master laser 9 is coupled into the Q-switched resonator by reflection from the surface of optic or polarizer 11.

Figure 8:
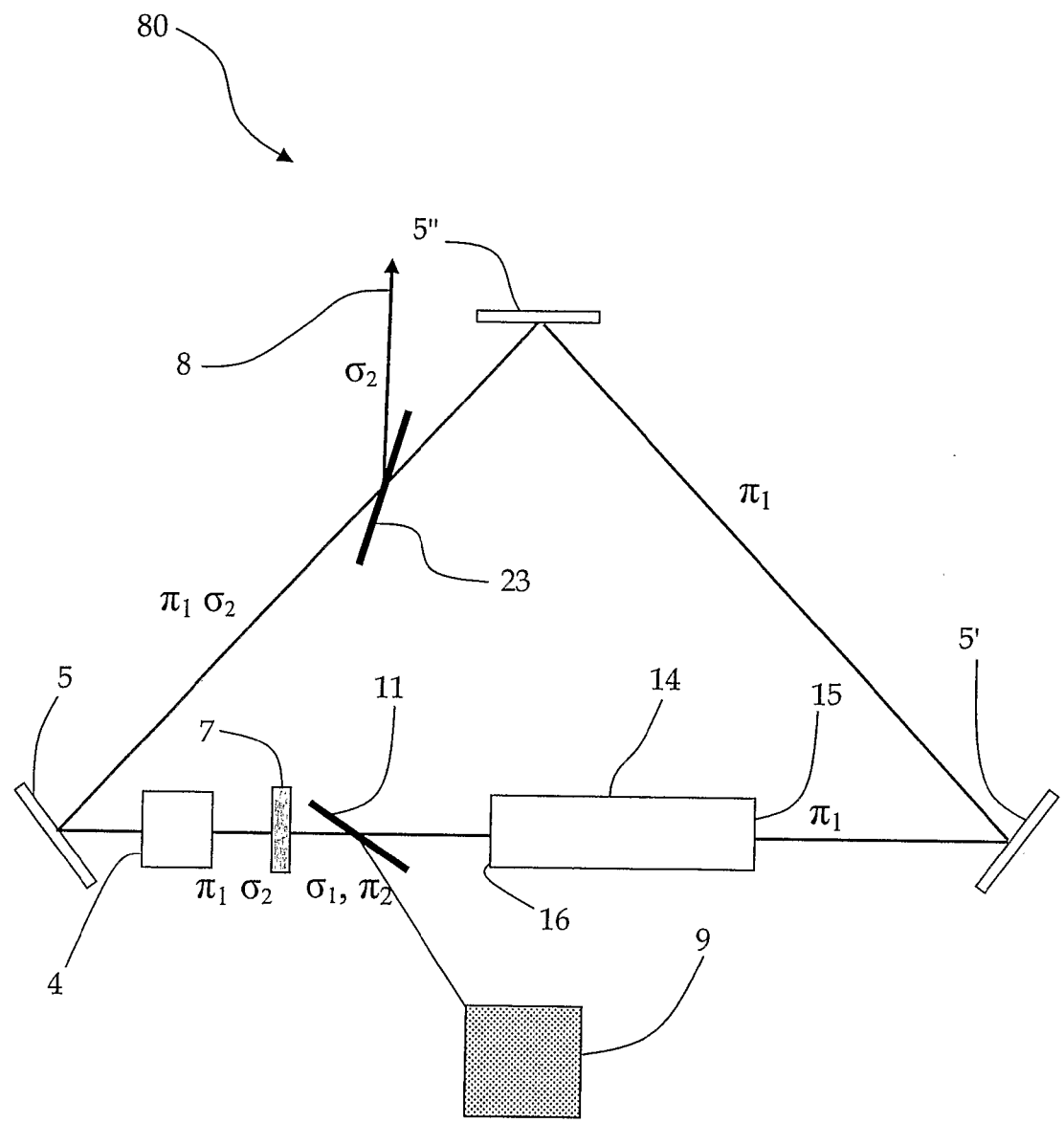
FIG. 8 is a schematic view of a system for producing a laser pulse according to an eighth illustrative embodiment of the present invention.

Referring now to FIG. 8, there is shown a system 80 for producing a laser pulse according to an eighth illustrative embodiment of the present invention. The operation of system 80 in this embodiment is the same as for that shown for system 70 in FIG. 7 except that gain medium 1 has been replaced with new gain medium 14 having an anti-reflection coated entrance face 15 and exit face 16 rather than Brewster-angled entrance and exit faces of gain medium 1 (see also FIGS. 4 and 5).

Figure 9:
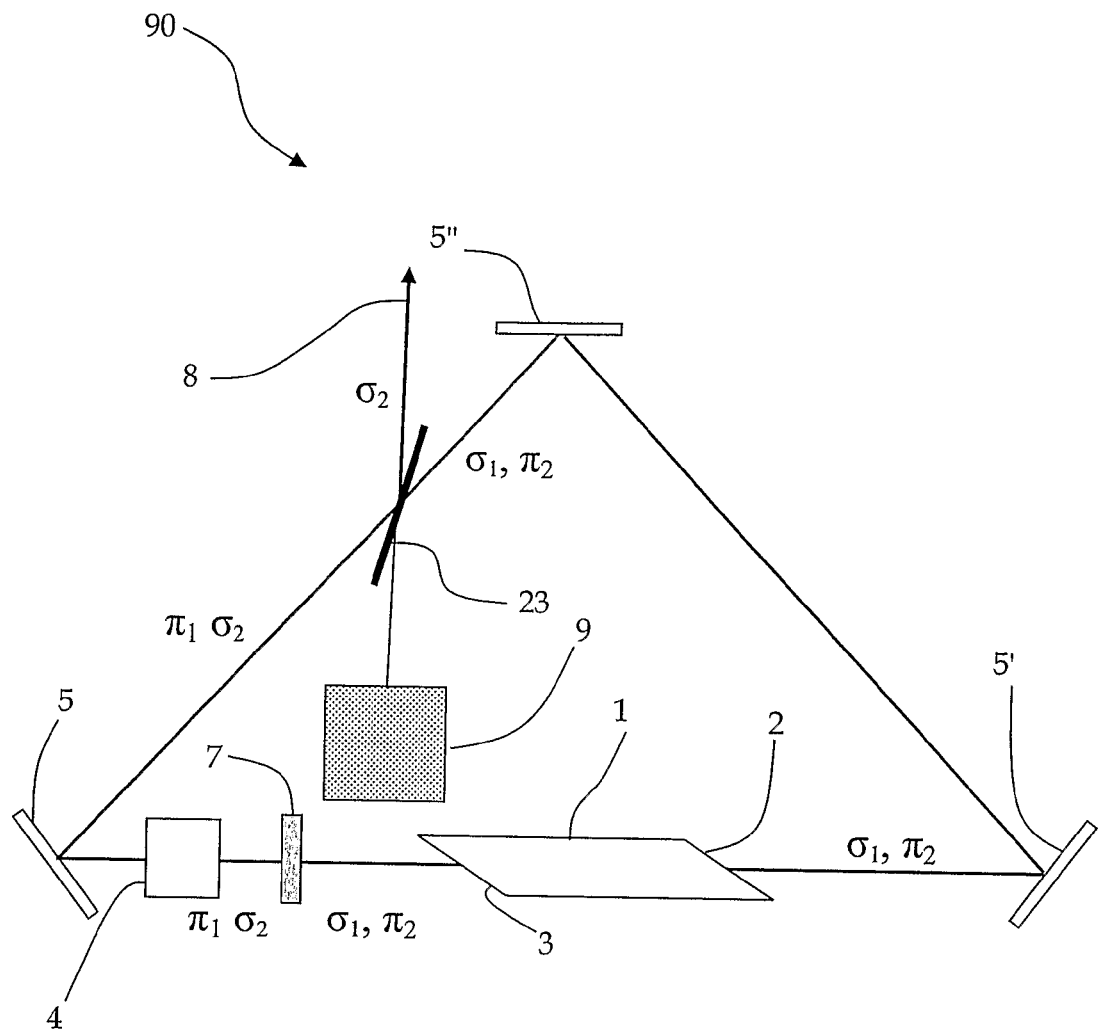
FIG. 9 is a schematic view of a system for producing a laser pulse according to a ninth illustrative embodiment of the present invention.

Referring now to FIG. 9, there is shown a system 90 for producing a laser pulse according to a ninth illustrative embodiment of the present invention. The operation of the resonator in this embodiment is substantially the same as for that shown in FIG. 8. In this embodiment however, the σ-polarized seed beam from master laser 9 is reflected from polarizer 23, and is σ polarized for its first pass through gain medium 1 and π polarized for its second pass through gain medium 1. The π-polarized radiation in gain medium 1 seeds the giant pulse.

Figure 10:
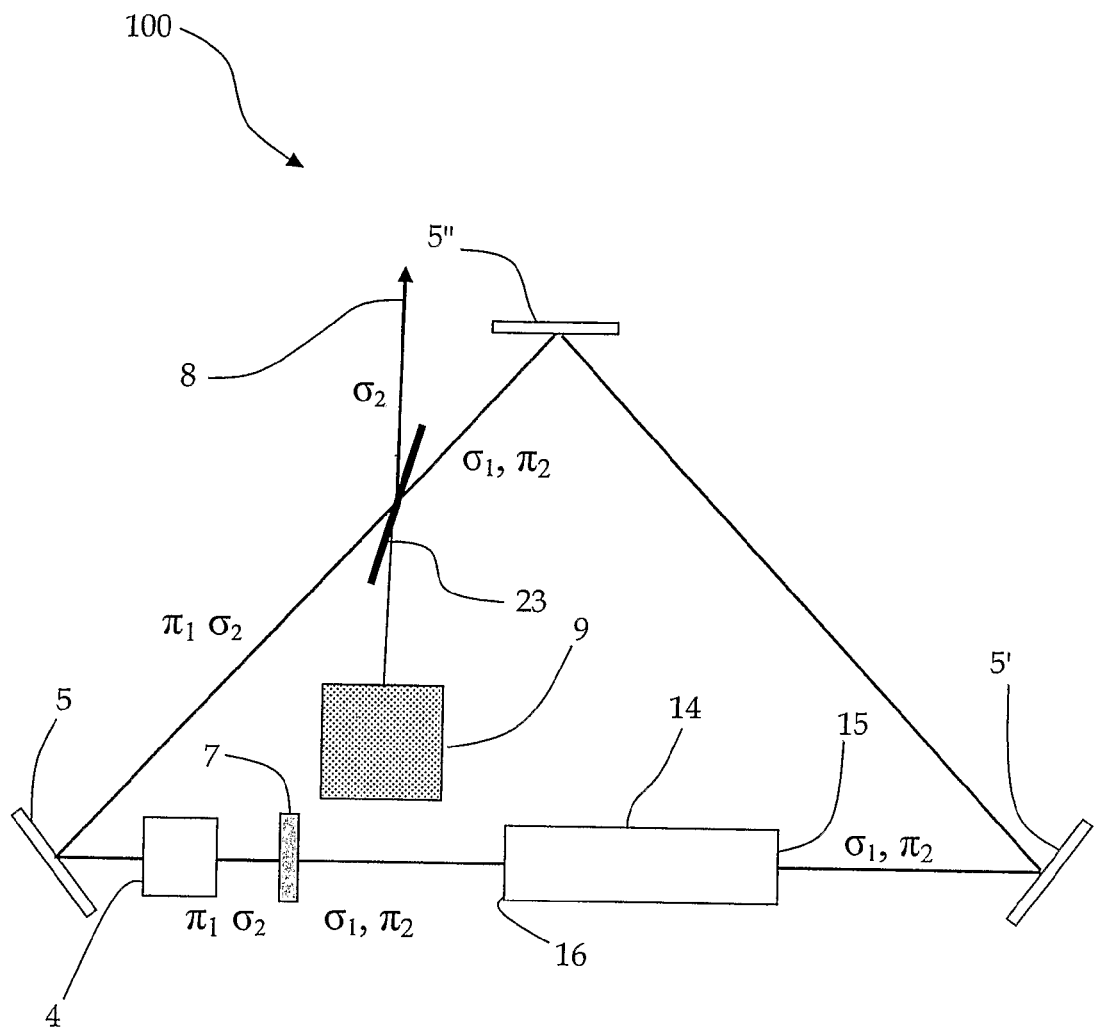
FIG. 10 is a schematic view of a system for producing a laser pulse according to a tenth illustrative embodiment of the present invention.

Referring now to FIG. 10, there is shown a system 100 for producing a laser pulse according to a tenth illustrative embodiment of the present invention. The operation of the resonator in this embodiment is the same as for that shown in FIG. 9 except that gain medium 1 has been replaced with new gain medium 14 having an anti-reflection coated entrance face 15 and exit face 16 rather than Brewster-angled entrance and exit faces of gain medium 1 (see also FIGS. 4, 5 and 8). In a further embodiment (not shown), retardation plate in FIG. 10 is moved to a location between polarizer 23 and gain medium 14 resulting in the σ-polarized radiation in gain medium 14 seeding the giant pulse.

Although a number of embodiments of the method and system of the present invention have been described in the foregoing detailed description, it will be understood that the invention is not limited to the embodiments disclosed, but is capable of numerous rearrangements, modifications and substitutions without departing from the scope of the invention as set forth and defined by the following claims.

The invention claimed is:

1. A system for producing a laser light pulse, said system including a travelling wave or ring laser incorporating a gain medium, said system including:
   polarizing means for introducing substantially polarized radiation having a first polarization state into said travelling wave laser;
   output coupling means to substantially output couple radiation having an output polarization state from said travelling wave laser;
   polarization changing means incorporated into an optical path of said travelling wave laser for changing the polarization of radiation having said first polarization state to a seeding polarization state, wherein radiation with said seeding polarization state seeds said gain medium for producing said laser light pulse; and
   radiation intensity modulation means for modulating an intensity of radiation in said travelling wave laser to vary the feedback of said radiation into said gain medium, wherein said radiation intensity modulation means also modulates said radiation with respect to said output coupling means thereby modulating a degree of output coupling of radiation from said travelling wave laser.

2. The system for producing a laser light pulse as claimed in claim 1, wherein said radiation intensity modulation means includes variable polarization changing means incorporated into the optical path of said travelling wave laser for variably changing the polarization of a proportion of radiation having said seeding polarization state to said output polarization state thereby modulating the degree of output coupling of radiation from said travelling wave laser.

3. The system for producing a laser light pulse as claimed in claim 2, wherein said output polarization state and said seeding polarization state are substantially the same.

4. The system for producing a laser light pulse as claimed in claim 1, wherein said gain medium includes Brewster-angled entrance and exit faces and wherein said polarizing means includes reflecting input laser radiation from a master laser from said exit face of said gain medium.

5. The system for producing a laser light pulse as claimed in claim 1, wherein said gain medium includes an entrance and an exit face and wherein said polarizing means includes a polarizer incorporated into the optical path between said exit face and said radiation intensity modulation means.

6. The system for producing a laser light pulse as claimed in claim 1, wherein said polarizing means and said output coupling means are a unitary polarizer element.

7. The system for producing a laser light pulse as claimed in claim 1, wherein said polarization changing means includes a half wave retardation plate.

8. The system for producing a laser light pulse as claimed in claim 2, wherein said variable polarization changing means includes a Pockels cell.

9. The system for producing a laser light pulse as claimed in claim 2, wherein the variable polarization changing means and the polarization changing means is a unitary device.

10. The system for producing a laser light pulse as claimed in claim 9, wherein the unitary device is a Pockels cell.

11. A method for producing a laser light pulse from a travelling wave or ring laser incorporating a gain medium, said method including:
   introducing substantially polarized radiation having a first polarization state into said travelling wave laser;
   changing the polarization of radiation having said first polarization state to a seeding polarization state, wherein radiation with said seeding polarization state seeds said gain medium for producing said laser light pulse;
   output coupling radiation having an output polarization state from said travelling wave laser;
   modulating the intensity of radiation in said travelling wave laser to vary the feedback of said radiation into said gain medium, wherein said modulating also modulates the degree of output coupling of radiation from said travelling wave laser.

12. The method for producing a laser light pulse as claimed in claim 11, wherein the step of modulating the intensity of radiation includes variably changing the polarization of a proportion of radiation having said seeding polarization state to said output polarization state, thereby modulating the degree of output coupling of radiation from said travelling wave laser.

13. The method for producing a laser light pulse as claimed in claim 12, wherein said output polarization state and said seeding polarization state are substantially the same.

14. The method for producing a laser light pulse as claimed in claim 11, wherein said gain medium includes Brewster-angled entrance and exit faces and wherein the step of introducing substantially polarized radiation having a first polarization state into said travelling wave laser includes reflecting input laser radiation from a master laser from said exit face of said gain medium.

15. The method for producing a laser light pulse as claimed in claim 11, wherein the step of introducing substantially polarized radiation having a first polarization state into said travelling wave laser is introduced after a gain step provided by the gain medium and prior to the step of modulating the intensity of radiation.

16. The method for producing a laser light pulse as claimed in claim 11, wherein the steps of introducing substantially polarized radiation having a first polarization state into said travelling wave laser and output coupling radiation having an output polarization state from said travelling wave laser are accomplished via a unitary polarizer element.

17. The method for producing a laser light pulse as claimed in claim 12, wherein the steps of variably changing the polarization of a proportion of radiation having said seeding polarization state to said output polarization state and changing the polarization of radiation having said first polarization state to said seeding polarization state are accomplished via a unitary device.

18. The method for producing a laser light pulse as claimed in claim 17, wherein the unitary device is a Pockels cell.

19. A laser light pulse produced in accordance with the method of claim 1.

20. A system for producing a laser light pulse, said system including a travelling wave or ring laser incorporating a gain medium, said system including:
    polarizing means for introducing substantially polarized radiation having a first polarization state into said travelling wave laser and to output couple radiation having substantially the same polarization state from said travelling wave laser;
    polarization changing means located in an optical path of said travelling wave laser between said polarizing means and an input for said gain medium for changing the polarization of radiation having said first polarization state to a seeding polarization state, wherein radiation with said seeding polarization state seeds said gain medium for producing said laser light pulse; and
    variable polarization changing means incorporated into the optical path of said travelling wave laser for variably changing the polarization of a proportion of radiation having said seeding polarization state to said output polarization state thereby modulating the degree of output coupling of radiation from said travelling wave laser, wherein the variable polarization changing means is located between an output of the gain medium and the polarizing means.

21. The system for producing a laser light pulse as claimed in claim 20, wherein the variable polarization changing means includes a Pockels cell.

22. The system for producing a laser light pulse as claimed in claim 20, wherein the polarization changing means includes a half wave retardation plate.

* * * * *